US008699333B2

(12) United States Patent
Vasseur et al.

(10) Patent No.: US 8,699,333 B2
(45) Date of Patent: Apr. 15, 2014

(54) CONGESTION-BASED TRAFFIC SHAPING FOR DISTRIBUTED QUEUING IN SHARED-MEDIA COMMUNICATION NETWORKS

(75) Inventors: Jean-Philippe Vasseur, Saint Martin d'Uriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 267 days.

(21) Appl. No.: 13/248,799

(22) Filed: Sep. 29, 2011

(65) Prior Publication Data

US 2013/0083658 A1  Apr. 4, 2013

(51) Int. Cl.
*H04J 1/16* (2006.01)
*H04L 12/28* (2006.01)

(52) U.S. Cl.
USPC ........... 370/230; 370/252; 370/392; 370/412; 370/444

(58) Field of Classification Search
USPC ......... 370/235, 230, 392, 412, 444, 445, 252, 370/465
See application file for complete search history.

(56) References Cited

U.S. PATENT DOCUMENTS

| | | | |
|---|---|---|---|
| 6,621,791 | B1 | 9/2003 | Davie |
| 6,865,185 | B1 | 3/2005 | Patel et al. |
| 7,061,860 | B1 | 6/2006 | Calvignac et al. |
| 7,068,624 | B1 | 6/2006 | Dantu et al. |
| 7,327,682 | B2 | 2/2008 | Gandhi et al. |
| 7,417,999 | B1 | 8/2008 | Charny et al. |
| 7,424,268 | B2 | 9/2008 | Diener et al. |
| 7,548,534 | B2 | 6/2009 | Zimmerman et al. |
| 7,627,675 | B2 | 12/2009 | Bernstein et al. |
| 7,640,355 | B1 | 12/2009 | Marshall et al. |
| 7,830,795 | B2 | 11/2010 | Zimmerman et al. |
| 7,970,893 | B2 | 6/2011 | Mohaban et al. |
| 7,978,725 | B2 | 7/2011 | Gong et al. |
| 2003/0016628 | A1 | 1/2003 | Kadambi et al. |
| 2005/0250509 | A1* | 11/2005 | Choksi ...................... 455/452.1 |
| 2006/0136233 | A1* | 6/2006 | Takeda et al. ..................... 705/1 |
| 2006/0146875 | A1* | 7/2006 | Yang ............................. 370/468 |

(Continued)

OTHER PUBLICATIONS

Cipolla, et al. "Notification of Transmittal of the International Search Report and the Written Opinion of the International Searching Authority, or the Declaration", Patent Cooperation Treaty, Jan. 21, 2013, 12 pages, PCT/US2012/057489, European Patent Office, Rijswijk, Netherlands.

(Continued)

*Primary Examiner* — Andrew Lee
(74) *Attorney, Agent, or Firm* — Edwards Wildman Palmer LLP; James M. Behrnke; Stephen D. LeBarron

(57) ABSTRACT

In one embodiment, a device in a shared-media communication network determines a priority of a packet to be queued at the device, and based on the priority determines a length of time the packet is allowed to be queued before being successfully transmitted. After attempting to successfully transmit the queued packet within the shared-media communication network, in response to reaching a threshold amount of the length of time without having successfully transmitted the queued packet, the device may transmit a "shaping" request to one or more reachable neighbors in the shared-media communication network. Specifically, the shaping request is for a temporary reduction in bandwidth utilization by the reachable neighbors for traffic having a comparatively lesser priority than the priority of the packet.

23 Claims, 13 Drawing Sheets

(56) References Cited

U.S. PATENT DOCUMENTS

| | | | |
|---|---|---|---|
| 2006/0178923 A1* | 8/2006 | Ricketts | 705/8 |
| 2007/0041321 A1* | 2/2007 | Sasaki et al. | 370/235 |
| 2007/0237177 A1* | 10/2007 | Endo et al. | 370/468 |
| 2008/0253325 A1* | 10/2008 | Park et al. | 370/329 |
| 2008/0259852 A1* | 10/2008 | Massiera et al. | 370/329 |
| 2009/0274047 A1 | 11/2009 | Kruys et al. | |
| 2010/0054125 A1 | 3/2010 | Bernstein et al. | |
| 2010/0226390 A1 | 9/2010 | Yan et al. | |
| 2011/0200017 A1* | 8/2011 | Amalfitano | 370/335 |
| 2012/0039173 A1* | 2/2012 | Danzig et al. | 370/235.1 |
| 2013/0007831 A1* | 1/2013 | Wu et al. | 725/116 |

OTHER PUBLICATIONS

Yaghmaee, et al., "Priority-Based Rate Control for Service Differentiation and Congestion Control in Wireless Multimedia Sensor Networks", Computer Networks, vol. 53, No. 11, Jul. 2009, pp. 1798-1811, Elsevier Science Publishers B.V., Amsterdam, Netherlands.

Winter et al., "RPL:IPv6 Routing Protocol for Low Power and Lossy Networks", <draft-ietf-roll-rpl-19> (Mar. 13, 2011 version).

Shelby et al., "Constrained Application Protocol (CoAP)", <draft-ietf-core-coap-07> (Jul. 8, 2011 version).

* cited by examiner

CONGESTION-BASED TRAFFIC SHAPING FOR DISTRIBUTED QUEUING IN SHARED-MEDIA COMMUNICATION NETWORKS

TECHNICAL FIELD

The present disclosure relates generally to communication networks, and, more particularly, to managing congestion in shared-media communication networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. For example, shared-media communication networks, such as power-line communication (PLC) networks (a type of communication over power-lines), provide an enabling technology for networking communication and can be used for example in Advanced Metering Infrastructure (AMI) networks, and are also useful within home and buildings. Interestingly, PLC lines share many characteristics with low power radio (wireless) technologies. In particular, though each device in a given PLC network may each be connected to the same physical power-line, due to their noisy environment, a PLC link is very much a multi-hop link, and connectivity is highly unpredictable, thus requiring multi-hop routing when the signal is too weak.

Many LLNs, particular AMI networks, demand that many different applications operate over the network, such as sensor reading, firmware upgrades, alarms, and so on. Generally speaking, these different applications have significantly different traffic characteristics, for example, unicast vs. multicast, small units of data vs. large units of data, low-latency vs. latency-tolerant, flows toward a head-end vs. away from the head-end, etc. Furthermore, since these applications must operate simultaneously over a highly constrained LLN network, the network can easily experience congestion, especially when different applications are sending traffic simultaneously. Without proper mechanisms, these situations can cause networks to violate critical service level agreements (SLAs), e.g., delaying the reception of critical alarms from a meter or a sensor. Accordingly, Quality of Service (QoS) mechanisms are a critical functionality in shared-media communication networks, particular the highly constrained LLNs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
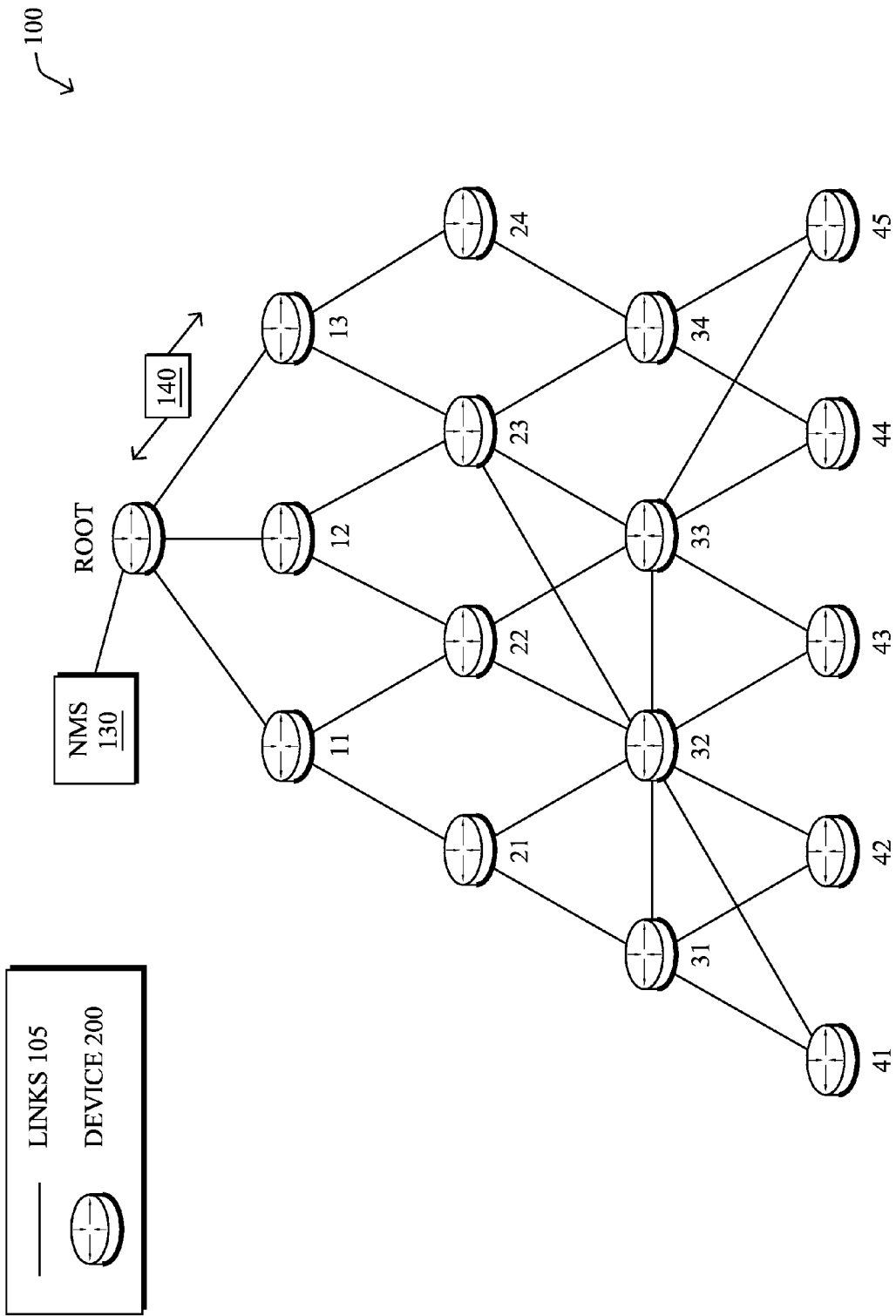
FIG. 1 illustrates an example shared-media communication network.

According to one or more embodiments of the disclosure, a device in a shared-media communication network determines a priority of a packet to be queued at the device, and based on the priority determines a length of time the packet is allowed to be queued before being successfully transmitted. After attempting to successfully transmit the queued packet within the shared-media communication network, in response to reaching a threshold amount of the length of time without having successfully transmitted the queued packet, the device may transmit a "shaping" request to one or more reachable neighbors in the shared-media communication network. Specifically, the shaping request is for a temporary reduction in bandwidth utilization by the reachable neighbors for traffic having a comparatively lesser priority than the priority of the packet.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc.

Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. In addition, a network management server (NMS) 130, or other head-end application device located beyond the root device (e.g., via a WAN), may also be in communication with the network 100.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
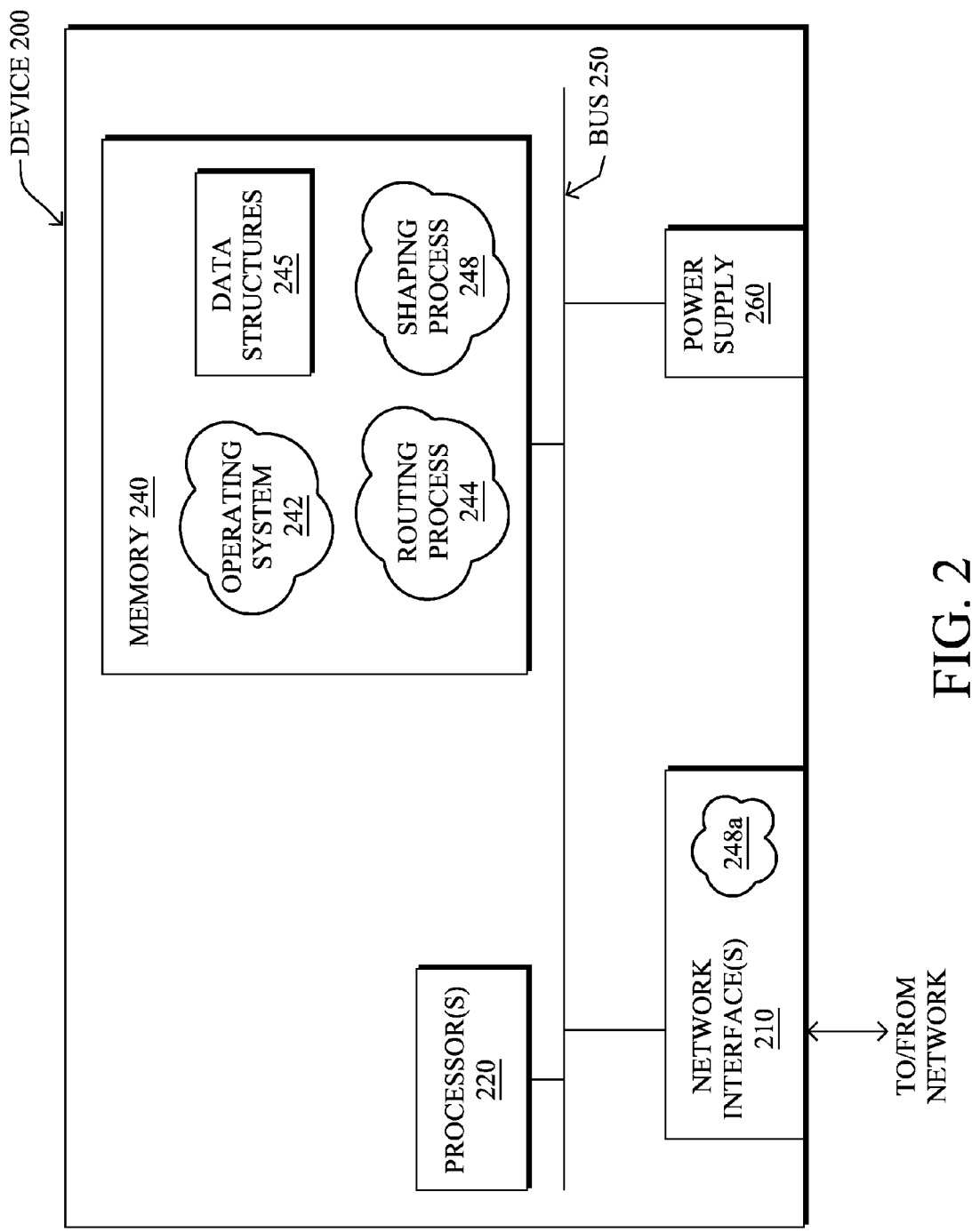
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative "shaping" process 248, as described herein. Note that while shaping process 248 is shown in centralized memory 240, alternative embodiments provide for the process to be specifically operated within the network interfaces 210, such as a component of a network layer operation within the network interfaces (as process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

As noted above, shared-media communication networks, such as power-line communication (PLC) networks (a type of communication over power-lines), provide an enabling technology for networking communication and can be used for example in Advanced Metering Infrastructure (AMI) networks, and are also useful within home and buildings. Interestingly, PLC lines share many characteristics with low power radio (wireless) technologies. In particular, though each device in a given PLC network may each be connected to the same physical power-line, due to their noisy environment, a PLC link is very much a multi-hop link, and connectivity is highly unpredictable, thus requiring multi-hop routing when the signal is too weak. For instance, the far-reaching physical media exhibits a harsh noisy environment due to electrical distribution transformers, commercial and residential electric appliances, and cross-talk effects. As an example, even in a building the average number of hops is between two and three (even larger when having to cross phases), while on an AMI network, on the same power phase line, the number of hops may vary during a day between one and 15-20. Those skilled in the art would thus recognize that due to various reasons, including long power lines, interferences, etc., a PLC connection may traverse multiple hops. In other words, PLC cannot be seen as a "flat wire" equivalent to broadcast media (such as Ethernet), since they are multi-hop networks by essence.

As further noted above, Many LLNs, particular AMI networks, demand that many different applications operate over the network. For example, the following list of applications may operate simultaneously over AMI networks:
1) Automated Meter Reading that involves periodically retrieving meter readings from each individual meter to a head-end server;
2) Firmware upgrades, e.g., that involve communicating relatively large firmware images (often 500 KB or more) from a head-end server to one device, multiple devices, or all devices in the network;
3) Retrieving load curves;
4) Real-time alarms generated by meters (e.g., power outage events) that actually act as sensors;
5) Periodically retrieving network management information from each meter to a Network Management System (NMS) 130;
6) Supporting demand response applications by sending multicast messages from a head-end device to large numbers of meters;
7) Etc.

Generally speaking, these different applications have significantly different traffic characteristics, for example, unicast vs. multicast, small units of data vs. large units of data, low-latency vs. latency-tolerant, flows toward a head-end vs. away from the head-end, etc. Furthermore, since these applications must operate simultaneously over a highly constrained LLN network, the network can easily experience congestion, especially when different applications are sending traffic simultaneously. For example, the bandwidth of LLN links may be as low as 4-5 KBits/s, and even lower when crossing transformers (for PLC). Without proper mechanisms, these situations can cause networks to violate critical SLAs, e.g., delaying the reception of critical alarms from a meter. Accordingly, Quality of Service (QoS) mechanisms are a critical functionality in shared-media communication networks, particular the highly constrained LLNs.

Numerous QoS mechanisms have been developed for "classic" IP networks (unconstrained), including: (1) queuing techniques, (2) Call Admission Control (CAC) using protocols such as the Resource reSerVation Protocol (RSVP) and/or input traffic shapers, (3) Traffic Engineering, (4) Congestion Avoidance techniques, etc. Where some of these techniques may apply to LLNs, most are costly in terms of bandwidth (control plane overhead), memory (state maintenance), and/or CPU processing. Furthermore, in the example of a conventional traffic shaper, such mechanisms are activated by a device itself for its own set of packets according to some local decision policy.

Dynamic Traffic Shaping for Distributed Queuing

According to techniques described herein, the use of traffic shapers may be dynamically enabled in a distributed fashion in a shared-media communication network. In particular, this may be achieved by prioritizing packets at the network layer, and monitoring the queuing delay for higher priority packets. When high priority packets have been queued for too long (due to network congestion), an illustrative shaping request may then be sent to neighboring nodes to indicate that a traffic shaper on neighboring devices should be dynamically enabled for packets being sent by those neighboring devices that have a lesser priority than that of the request, i.e., less than the priority of the packet that has been stalled.

Specifically, according to one or more embodiments of the disclosure as described in detail below, a device in a shared-media communication network determines a priority of a packet to be queued at the device, and based on the priority determines a length of time the packet is allowed to be queued before being successfully transmitted. After attempting to successfully transmit the queued packet within the shared-media communication network, in response to reaching a threshold amount of the length of time without having successfully transmitted the queued packet, the device may transmit a "shaping" request to one or more reachable neighbors in the shared-media communication network. Specifically, the shaping request is for a temporary reduction in bandwidth utilization by the reachable neighbors for traffic having a comparatively lesser priority than the priority of the packet.

Illustratively, the techniques described herein may be performed by hardware, software, and/or firmware, such as in accordance with the "shaping" process 248/248a, which may contain computer executable instructions executed by the processor 220 (or independent processor of interfaces 210) to perform functions relating to the novel techniques described herein. For example, the techniques herein may be treated as extensions to conventional protocols, such as the various PLC protocols or wireless communication protocols, and as such, may be processed by similar components understood in the art that execute those protocols, accordingly.

Operationally, the techniques herein generally relate to having a node with critical traffic dynamically activating traffic shaping on neighboring nodes that have less critical traffic to send. According to the techniques herein, a policy may first be defined for prioritizing traffic. For example, the policy for assigning a priority to a packet may be provided by some global device in the network, or else may be pre-configured on the devices 200 themselves. Examples of global devices from which configuration of how to classify priority of packets may be received comprise NMS 130, the root node, a head-end application device, a dynamic host configuration protocol (DHCP) server (e.g., during the joining process), and a Constrained Application Protocol (CoAP) server (e.g., as defined in the IETF Internet Draft entitled "Constrained Application Protocol (CoAP)" <draft-ietf-core-coap-07>, by Shelby et al. (Jul. 8, 2011 version)).

Based on the configured policy, the priority of a packet 140 to be queued at a device may be determined based on a number of factors. For example, the priority may be based on an explicit priority field within the packet, a packet type, a traffic class of the packet, a particular flow associated with the packet, a particular differentiated services (DS) byte value within the packet (e.g., IPv6 DS byte), a particular destination address of the packet, a particular source address of the packet, and a certain factor based on deep packet inspection of the packet (e.g., data, information, etc.).

Figure 3:
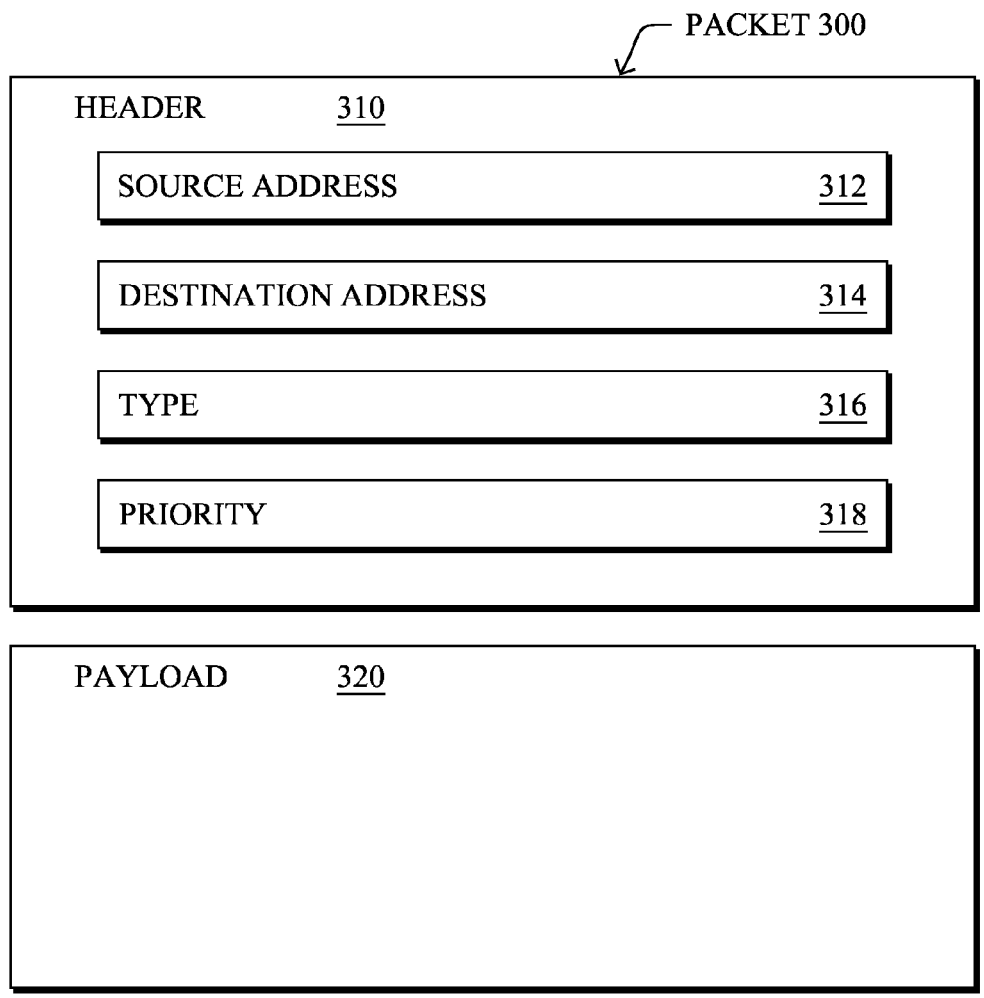
FIG. 3 illustrates an example packet format.

FIG. 3 illustrates an example packet format 300 (e.g., a packet 140), where the packet 300 contains a header 310 and a payload 320, as may be appreciated by those skilled in the art. In particular, the header 310 generally carries the information used to forward the packet 300, such as source address 312 and destination address 314, various labels, encapsulations, etc., and may include a packet type field 316. In addition, a priority field 318, such as an explicit priority value, a DS byte value, etc., may also be populated based on the priority of the packet (e.g., by an application or other process generating the packet 300, accordingly).

Note that in one embodiment, the priority of the packet is limited to either being a priority packet or a non-priority packet. Alternatively, there may be a hierarchy of priorities, such as certain packets having a greater/higher priority than other packets with a comparatively lesser/lower priority. (Note that higher and lower need not represent numerical values of priority, but rather a comparative "criticality" of the packet, accordingly.) In the remainder of this description, "P1" is used to indicate the top priority value for packets.

Figure 4A:
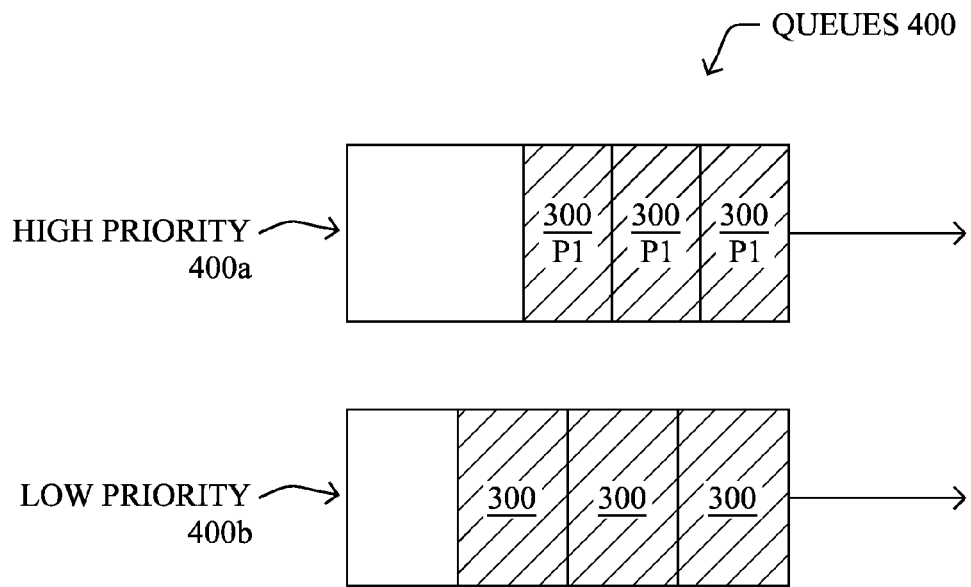
FIGS. 4A-4B illustrate example packet queues.
Figure 4B:
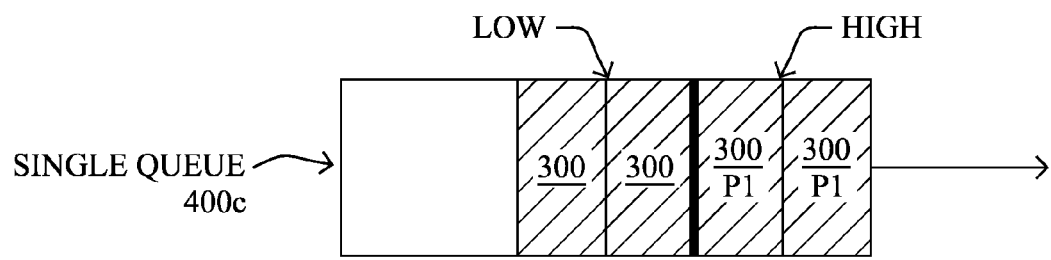

Based on the priority of a particular packet, a length of time that the packet is allowed to be queued before successfully transmitting the packet can be determined. For instance, assuming a packet either has a priority of P1 or not, those critical packets with priority P1 may be monitored. Each time a packet of priority P1 is queued, the node starts a timer T that reflects the maximum amount of time that the packet may wait in the queue before being sent into the shared-media network; the value of that timer T may have been provided by the NMS, local configuration, or other management device. For example, FIG. 4A illustrates an example set of queues 400 (400a and 400b), where top priority P1 packets enter a high-priority queue 400a, while non-priority packets enter a low- (or non-) priority queue 400b. Alternatively, as shown in FIG. 4B, a single combined queue 400c is shown, where high-priority P1 packets may be placed in front of non-priority packets. Note that as a further alternative, high-priority P1 packets and non-priority packets may be simply queued in the order in which they are scheduled for transmission in the single queue 400c, but the techniques herein may only initiate the timer T for those high-priority P1 packets within the queue 400c. According to the embodiments where a hierarchy of priorities exist, each priority level may or may not be associated with a different timer "T", and may or may not have its own associated queue 400. Also of note, the length of time T is unlimited for one or more priorities comparatively lesser than a threshold priority, e.g., non-priority (non-P1) packets, or else a set of one or more "low" priority values.

While the packet 300 is within the queue 400, the network device attempts to successfully transmit the queued packet within the shared-media communication network until reaching a threshold amount of the length of time without having successfully transmitted the queued packet. For example, in one embodiment, the threshold amount may be a fraction of the length of time a packet is allowed to be queued, i.e., in order to account for further delay associated with initiating the traffic shaping techniques herein. In an alternative embodiment, the threshold may instead be the complete expiration of the length of time, i.e., where the "length of time allowed in the queue" noted above reflects a length of time a packet is allowed in the queue before initiating the traffic shaping techniques herein. (Said differently, if the "length of time allowed in the queue" is X, then in the first noted embodiment traffic shaping is initiated prior to X, while in the second embodiment, traffic shaping is initiated at X.)

Figure 5A:
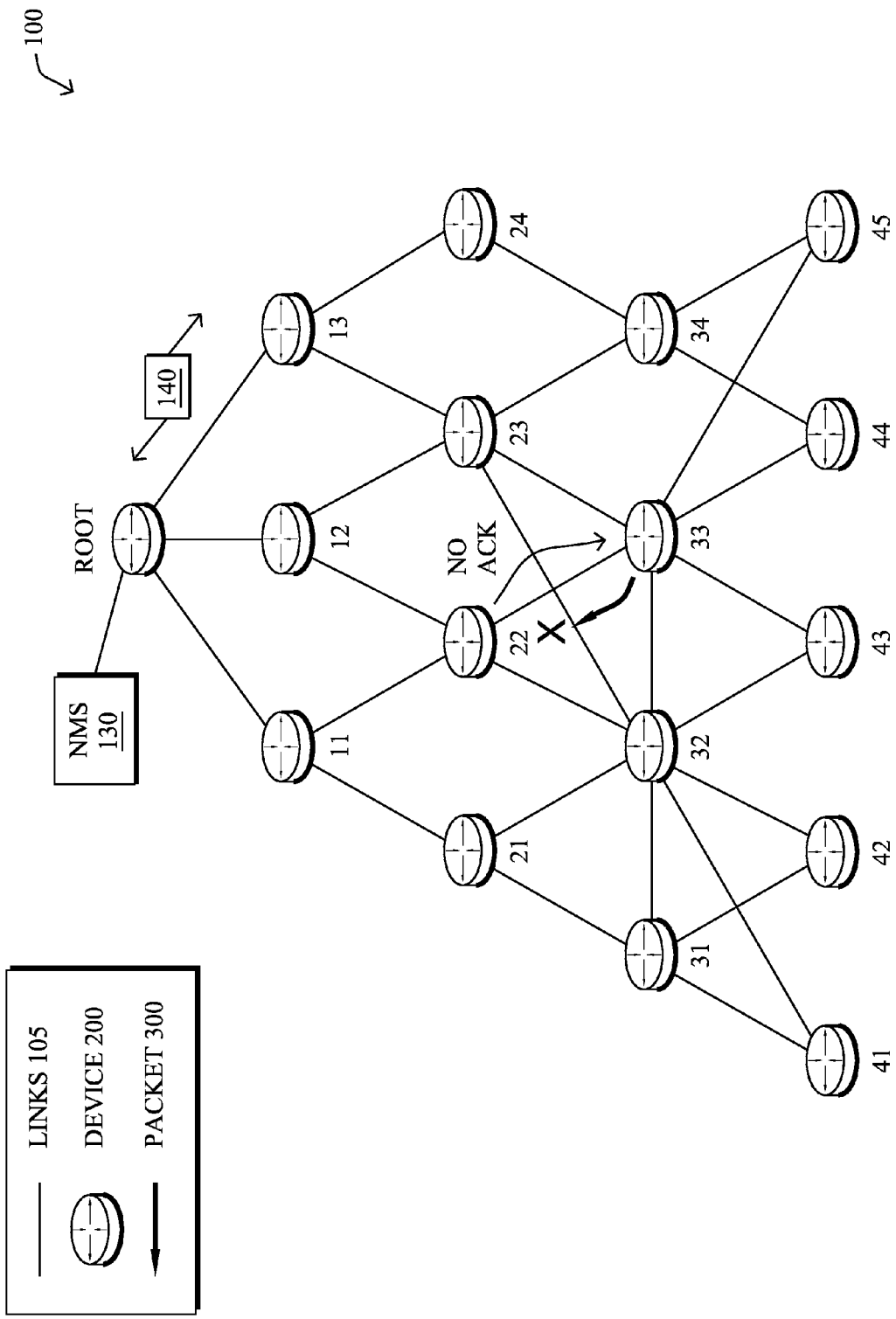
FIGS. 5A-5B illustrate examples of congestion in the network.
Figure 5B:
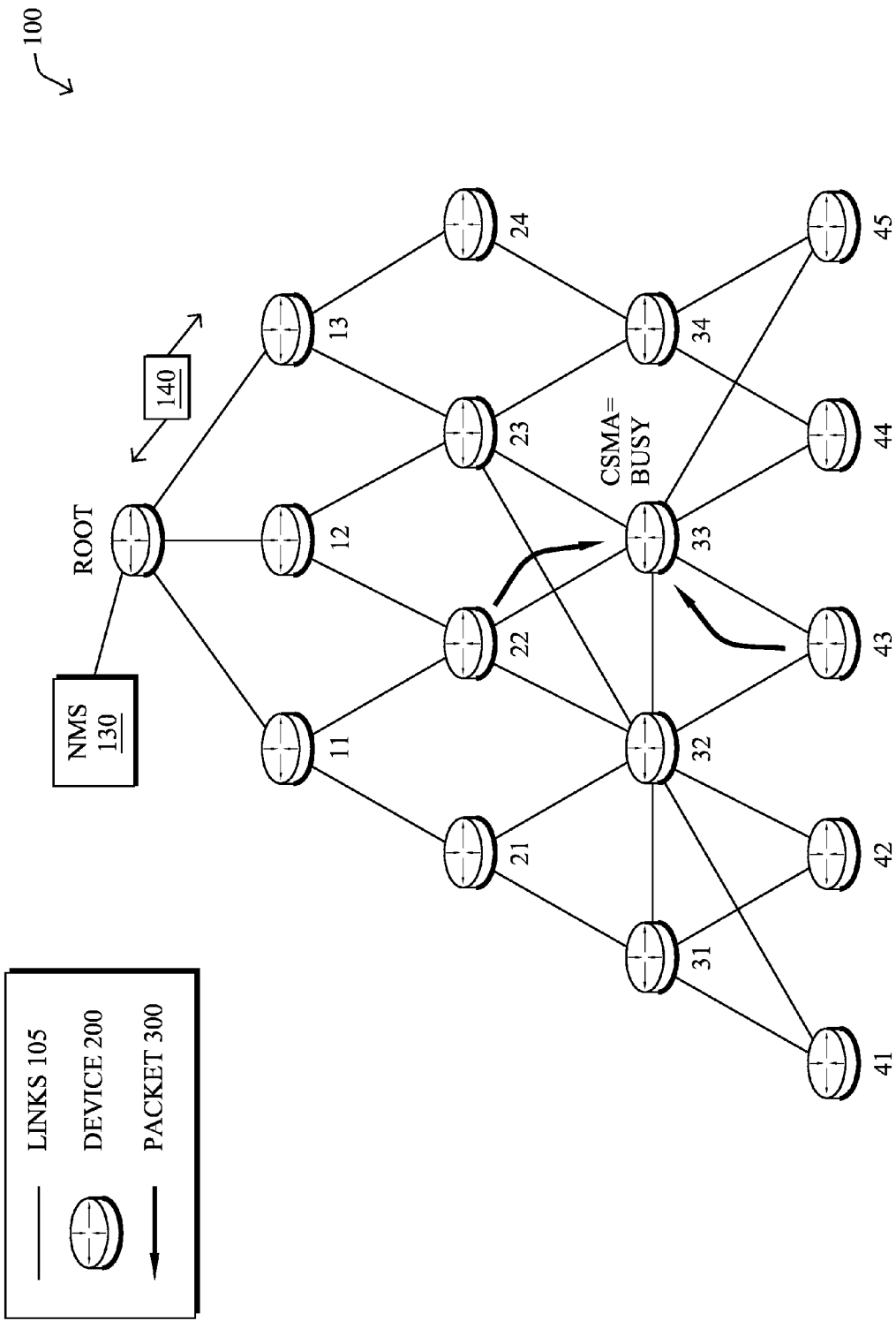

FIGS. 5A-5B illustrate examples of shared-media network congestion, where a queued packet may not be successfully transmitted. For instance, FIG. 5A illustrates the occurrence of the intended receiver (e.g., node 33 transmitting to node 22) not receiving the packet 300 (where node 33 receives no acknowledgment), either due to interference from hidden nodes (e.g., node 12) or else due to the receiver node 22 being in transmit mode for its own packets, etc. Alternatively, in FIG. 5B, one or more nodes (e.g., 22 and/or 43) may be transmitting its own packets, and as such, node 33 may detect this transmission (e.g., using carrier sense media access, CSMA, techniques), and may determine that the channel is not clear for another transmission. Other examples of why a queued packet may become stalled in a queue (due to congestion) may also occur, and FIGS. 5A-5B are merely examples.

Figure 6:
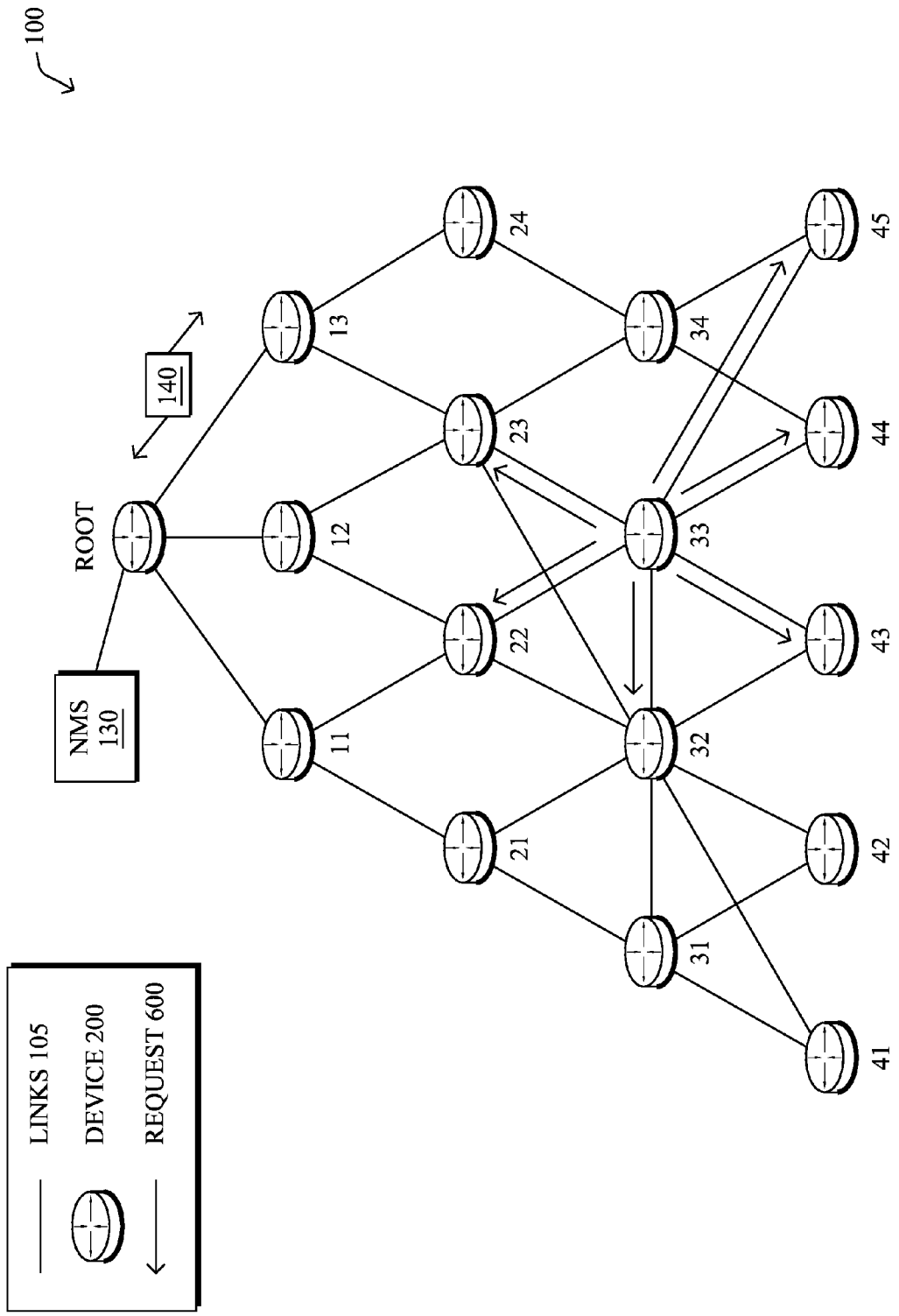
FIG. 6 illustrates an example distribution of a request message.
Figure 7:
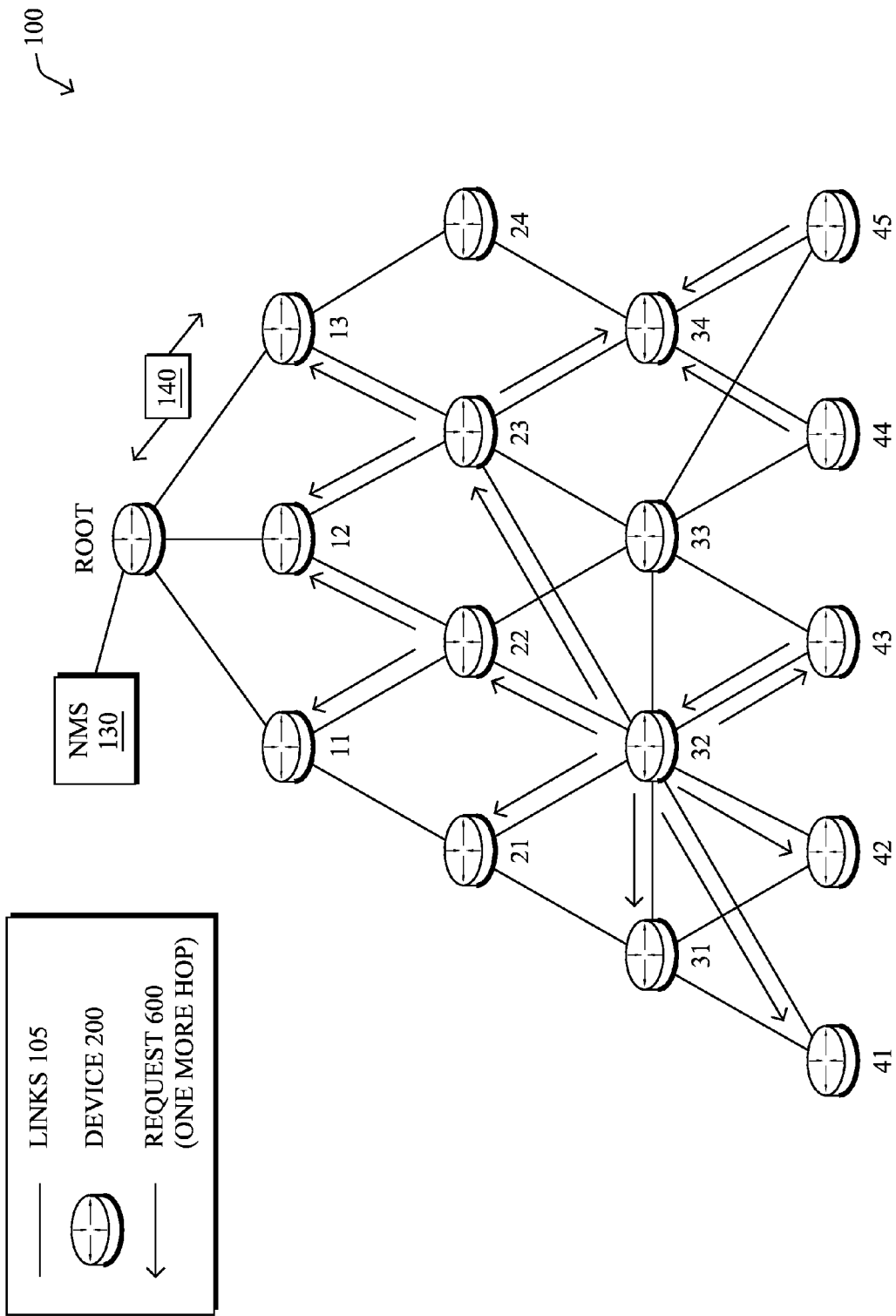
FIG. 7 illustrates an example request message.

In response to reaching the threshold amount of the allowed time (e.g., a fraction or the entire length of time), the stalled device may transmit a "shaping" request to one or more reachable neighbors in the shared-media communication network, where the request is for a temporary reduction in bandwidth utilization by the reachable neighbors for traffic having a comparatively lesser priority than the priority of the queued packet. That is, as shown in FIG. 6, through the use of a distributed request message 600, a traffic shaper may be dynamically enabled on a set of neighboring nodes. Illustratively, the shaping request 600 may be sent as an IP link-local multicast message, or other type of distributed message (e.g., broadcast) that can be used in all shared-media link types to reach the set of reachable neighbor devices. Note that as shown in FIG. 7, in one or more specific embodiments herein, those reachable neighbors may be configured to forward the request one hop further from the device (e.g., an initially broadcast request 600 with a time-to-live value of "2"). In this instance, the scope of the traffic shaping may be extended in order to account for "hidden" nodes, i.e., those nodes which the queuing device cannot "see," but that may interfere with an intermediate node (e.g., node 12 is hidden to node 33, as node 12 may affect node 22's ability to receive node 33's communications).

Figure 8:
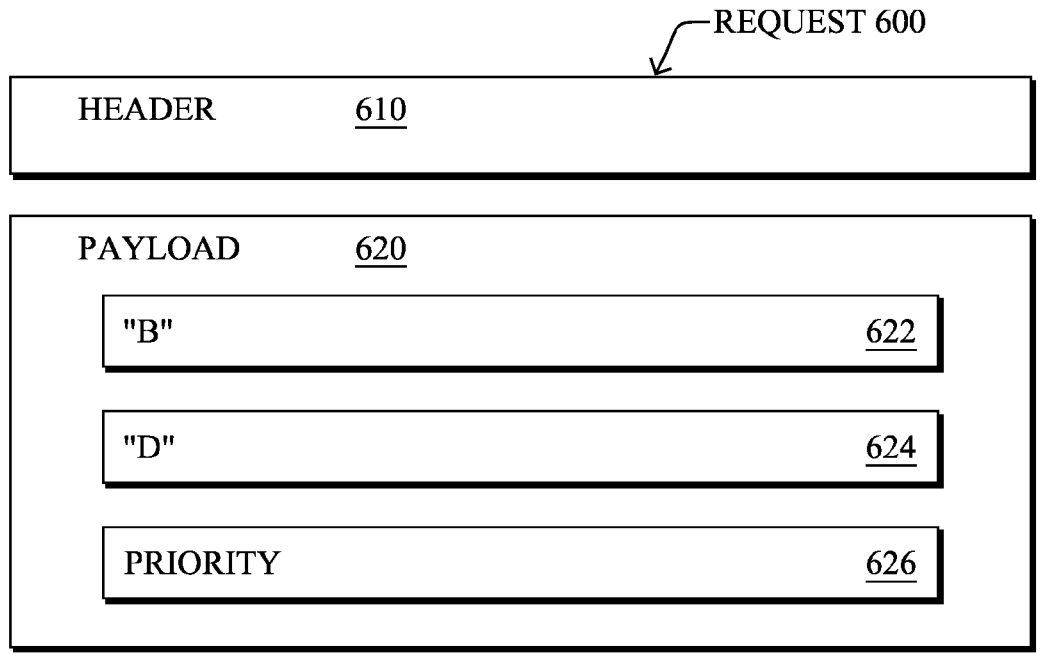
FIG. 8 illustrates another example of packet queues.

FIG. 8 illustrates an example simplified format of a request message 600 (e.g., a type of packet 140), which may comprise a header 610 suitable for transmitting the request within the corresponding communication protocol, and a payload 620. Illustratively, the payload 620 may comprise (unless otherwise statically configured on the receiving devices), a particular bandwidth utilization reduction "B" 622, a shaping duration "D" 624, and a priority level 624 (e.g., P1 or otherwise) of the critical packet(s) that caused the transmission of the request message. In one embodiment, B may be an absolute bandwidth reduction value (e.g., kbits/sec). In another embodiment, B may be a fraction of channel capacity overall, or else a fraction of channel capacity currently utilized by each respective reachable neighbor (e.g., reduce by 50%).

Figure 9:
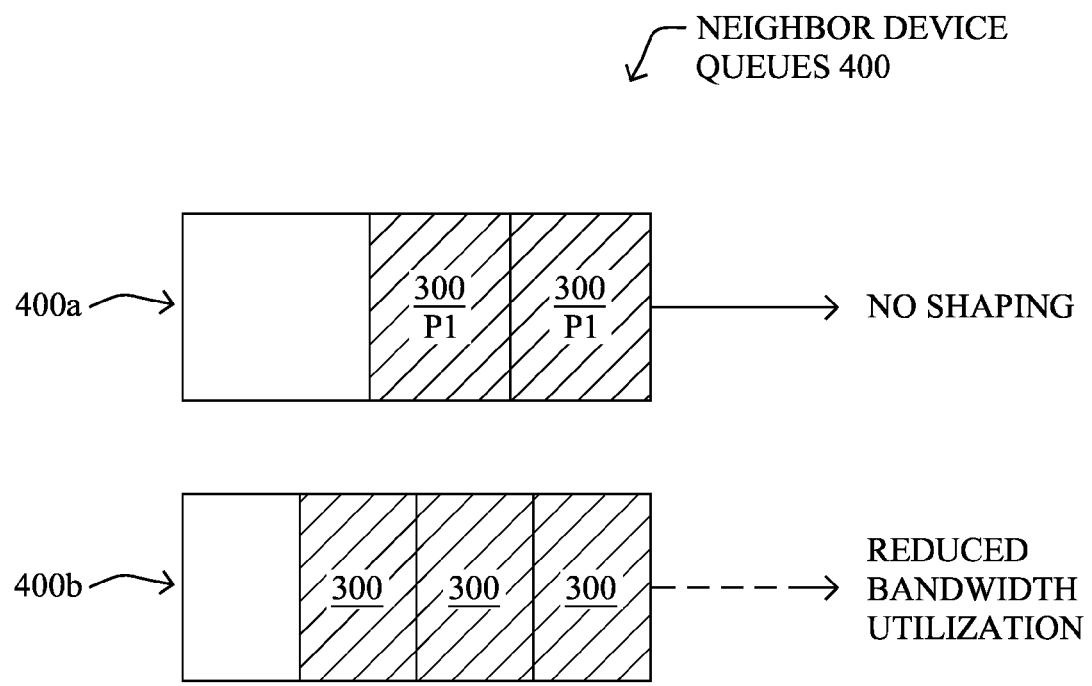
FIG. 9 illustrates another distribution of the request message.

Nodes receiving the shaping request 600 start using a dynamically adjusted traffic shaper for packets that have lower priority than what is indicated in the request message 600. That is, the traffic shaper (process 248) may be configured according to the bandwidth parameter B for a timer duration D. FIG. 9 illustrates an example of the queues 400 (according to the embodiment in FIG. 4A above with separate priority queues 400a and 400b) of the neighboring device operating according to traffic shaping. In particular, after having received a shaping request message 600, a device (e.g., node 22) may activate its shaping, such that lower priority traffic (e.g., non-priority in one embodiment, or else lesser/lower priority in a hierarchical priority embodiment) may be allotted a reduced bandwidth for transmission, in order to "free up" channel bandwidth for the higher-priority packet that is currently stalled in the queue of the requesting network device.

Note that nodes may still send traffic using any remaining bandwidth utilization that it has (i.e., it is a reduced utilization, not a suspended utilization), and these nodes may also continue to prioritize those packets during transmission. For instance, based on determining a priority of a packet to be queued by a traffic shaping device during the temporary reduction of bandwidth utilization, if the priority is equal to or comparatively greater than the indicated priority within the incoming request 600, then the device may attempt to successfully transmit its own queued packet without consideration of the temporary reduction of bandwidth utilization. That is, the reduction is for lower priority packets, so if an equal or greater priority packet is to be transmitted, the traffic shaping need not apply to such a packet, accordingly. Note also that alternatively, the device may simply decide to delay its high priority packet if the packet has not been queued for a long time.

After the time duration D expires, the neighboring nodes disable use of the traffic shapers and are free to transmit messages without the constraints imposed by the traffic shapers.

Note that in accordance with one or more additional embodiments, queuing network devices may choose to monitor the priorities of packets sent by their neighbors. In doing so, a device may choose to suppress sending a shaping request 600 if it notices that neighboring nodes are also sending packets with the same or greater priority. That is, by determining that a portion of received traffic (e.g., some threshold percentage or else all/most of the traffic) has a particular priority that is equal to or comparatively greater than the priority of the queued and stalled packet, the queuing device may decide to suppress transmission of the request 600, as it would essentially have no effect on reducing the congestion in the network.

Figure 10:
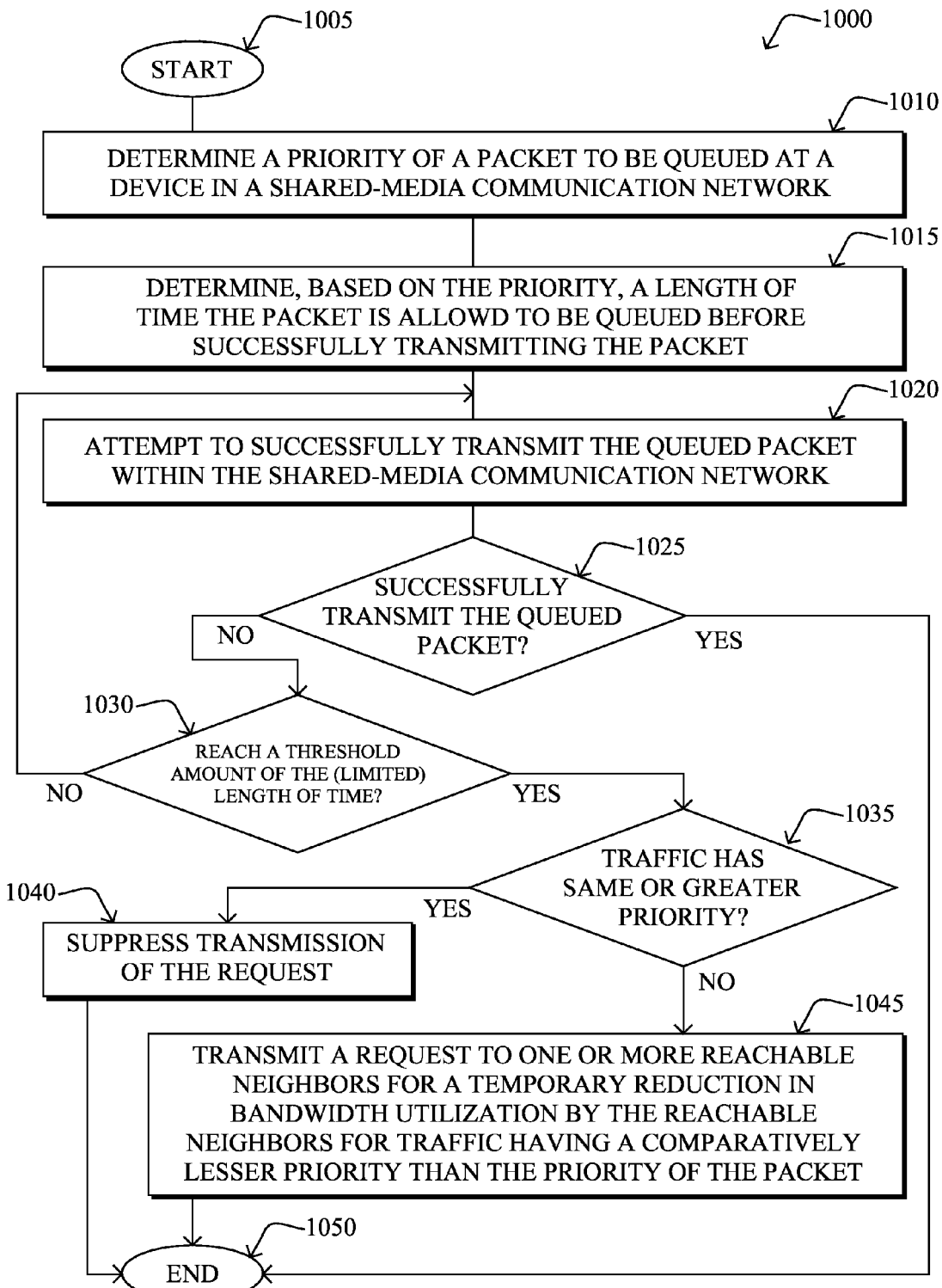
FIG. 10 illustrates an example simplified procedure for dynamically enabling traffic shapers in a shared-media communication network, e.g., from the perspective of the requesting device.

FIG. 10 illustrates an example simplified procedure for dynamically enabling traffic shapers in a shared-media communication network in accordance with one or more embodiments described herein, e.g., from the perspective of the requesting device. The procedure 1000 starts at step 1005, notably having received configuration of how to classify packet priority, and continues to step 1010, where, as described in greater detail above, a network device (e.g., node 33) determines a priority of a packet 300 to be queued. Accordingly, in step 1015, the device may determine, based on the priority, a length of time the packet is allowed to be queued before successfully transmitting the packet, and may begin attempting to successfully transmit the queued packet within the shared-media communication network in step 1020. For example, while certain lower priority packets may have a relatively unlimited amount of time to be transmitted, certain higher priority packets may be configured with a given time limit for its successful transmission, as described above.

If the packet is successfully transmitted in step 1025, then the procedure ends in step 1050. However, once a threshold amount of the (limited) length of time is reached in step 1030 without successfully transmitting the queued packet, then the traffic shaping described above may be initiated. In particular, unless optionally suppressing transmission of a request 600 in step 1040 in response to determining that the congestion is due to traffic of the same or greater priority in step 1035, then in step 1045 the request 600 is transmitted as described above. That is, in step 1045, the request 600 is transmitted to one or more reachable neighbors for a temporary reduction in bandwidth utilization by the reachable neighbors for traffic having a comparatively lesser priority than the priority of the packet. The procedure 1000 illustratively ends at step 1050, notably while the device continues to attempt to successfully transmit the queued packet in step 1020. If the packet remains unsuccessful, another round of traffic shaping may or may not be requested, or else the packet may be dropped (e.g., prompting an error or failure condition).

Figure 11:
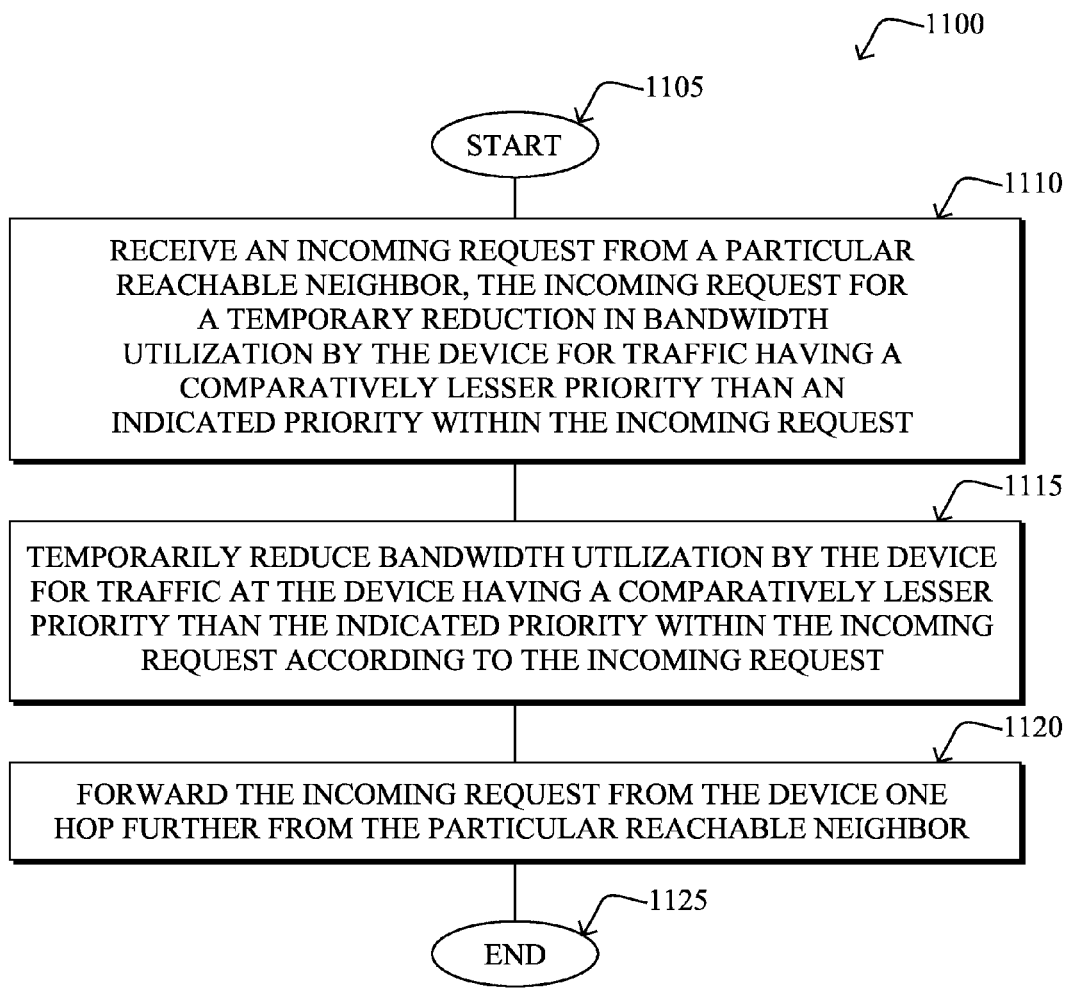
FIG. 11 illustrates another example simplified procedure for dynamically enabling traffic shapers in a shared-media communication network, e.g., from the perspective of the neighboring device.

In addition, FIG. 11 illustrates another example simplified procedure for dynamically enabling traffic shapers in a shared-media communication network in accordance with one or more embodiments described herein, e.g., from the perspective of the neighboring device. The procedure 1100 starts at step 1105, and continues to step 1110, where, as described in greater detail above, a device (e.g., node 22) receives an incoming request 600 from a particular reachable neighbor (e.g., node 33), the incoming request for a temporary reduction in bandwidth utilization by the device for traffic having a comparatively lesser priority than an indicated priority 626 within the incoming request. According to the request, in step 1115 the device triggers traffic shaping by temporarily reducing bandwidth utilization (e.g., by bandwidth amount B for duration D) for traffic at the device having a comparatively lesser priority than the indicated priority within the incoming request. Optionally, as mentioned above, in step 1120, the device receiving the request 600 may forward the incoming request one hop further, e.g., to reduce congestion impact from hidden nodes. The procedure 1100 illustratively ends in step 1125.

Figure 12:
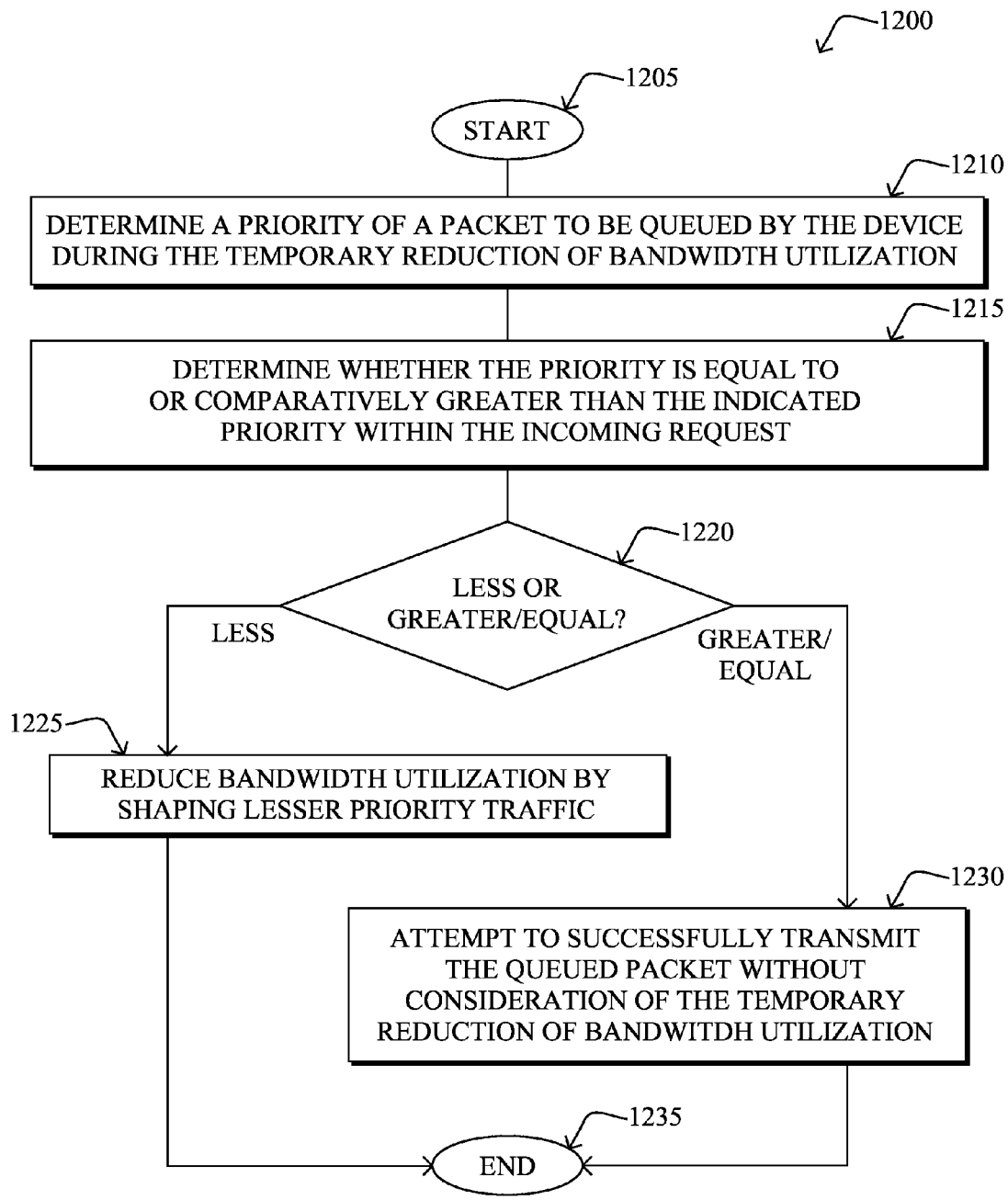
FIG. 12 illustrates another example simplified procedure for dynamically enabling traffic shapers in a shared-media communication network from the perspective of the requesting device, e.g., for handling packets during reduced bandwidth utilization.

Lastly, FIG. 12 illustrates another example simplified procedure for dynamically enabling traffic shapers in a shared-media communication network from the perspective of the requesting device, e.g., for handling packets during reduced bandwidth utilization. The procedure 1200 starts at step 1205, and continues to step 1210, where, as described in greater detail above, during the temporary reduction of bandwidth utilization (traffic shaping), e.g., as in step 1115 of procedure 1100 above, the device determines a priority of a packet to be queued by the device, and in step 1215 determines whether the priority is equal to or comparatively greater than the indicated priority 626 within the incoming request 600. If less than the indicated priority in step 1120, then in step 1125 the device reduces bandwidth utilization by shaping the lesser priority traffic. Conversely, if the queued packet's priority is greater than the indicated priority 626, then in step 1230 the device may attempt to successfully transmit the queued packet without consideration of the temporary reduction of bandwidth utilization, as noted above. The procedure 1200 illustratively ends in step 1235, e.g., until an additional packet is queued or else until the traffic shaping duration (e.g., duration D) is concluded.

It should be noted that while certain steps within procedures 1000-1200 may be optional as described above, the steps shown in FIGS. 10-12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1200 are described separately, certain steps from each procedure may be incorporated into each other procedure, and the procedures are not meant to be mutually exclusive.

The novel techniques described herein, therefore, provide for dynamic enabling of traffic shapers in a shared-media communication network. In particular, the techniques herein provide a reactive mechanism for shared-media (e.g., for LLNs) that reduces delay for critical packets (e.g., alarms) upon network congestion using a distributed localized protocol. For example, a system in accordance with the techniques herein dynamically shapes traffic as needed to allow nodes to forward critical traffic with low latency, and operates in a fully local and distributed fashion to minimize control overhead and latency. In addition, the techniques herein generally operate at the network layer, providing useful information about a packet (e.g., IPv6 DS byte and deep packet inspection) and other packets in the queue.

In addition, in contrast with "classic" IP networks with point-to-point links (e.g., optical or SDH), one of the core issues in dealing with QoS in shared low-bandwidth environments (e.g., IEEE 802.15.4 and P1901.2) lies in the fact that there are no network-layer mechanisms for temporarily reducing the transmission rate by neighboring nodes in order to send a critical message. Note that QoS techniques such as scheduling (e.g., priority queuing and Modified Deficit Round Robin or "MDRR") do not help in solving this particular issue. Indeed, queuing techniques help a node prioritizing which packets to send first on the wire. However, queuing techniques do not help the node attain some additional channel capacity to send critical packets when necessary, as do the techniques described herein.

Still further, the known time-synchronized mesh protocol or "TSMP" is an integrated link and network-layer protocol that strictly schedules all traffic flows. As a result, device can dynamically request and release channel capacity. However, TSMP centrally assigns communication bandwidth, increasing latency and reducing flexibility in adjusting channel capacity between nodes and flows. The IP-based solution herein is based on a different paradigm with a fully distributed approach.

Moreover, WiFi networks typically employ request-to-send/clear-to-send (RTS/CTS) techniques to temporarily suspend all transmissions by neighboring nodes when sending one or more packets. However, this is a MAC layer function and does not apply to the network layer. In contrast, the mechanisms described herein is a network layer technique, allowing the control mechanisms to have much better information into what packets are queued. Furthermore, as a critical difference to RTS/CTS techniques, the proposed approach does not consist in suspending other nodes' traffic, but rather adapts the other nodes' sending rate to leave room for critical traffic, after observing the traffic priority of packets using the channel. Accordingly, the techniques herein utilize the channel in a much more effective fashion.

While there have been shown and described illustrative embodiments that provide for dynamic enabling of traffic shapers in a shared-media communication network, it is to be understood that various other adaptations and modifications may be made within the spirit and scope of the embodiments herein. For example, the embodiments have been shown and described herein with relation to constrained networks, such as LLNs. However, the embodiments in their broader sense are not as limited, and may, in fact, be used with other types of shared-media networks and/or protocols. In addition, while the techniques herein are described for packetized communication, non-packetized communication may also benefit from the techniques herein, so long as there is a manner through which a priority of the communications may be determined.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining a priority of a packet to be queued at a device in a shared-media communication network;
   determining, based on the priority, a length of time the packet is allowed to be queued before successfully transmitting the packet;
   attempting to successfully transmit the queued packet within the shared-media communication network; and in response to reaching a threshold amount of the length of time without having successfully transmitted the queued packet, transmitting a request from the device to one or more reachable neighbors in the shared-media communication network, the request for a temporary reduction in bandwidth utilization by the reachable neighbors for traffic having a lesser priority than the priority of the packet.

2. The method as in claim 1, further comprising:
receiving an incoming request at the device from a particular reachable neighbor of the one or more reachable neighbors, the incoming request for a temporary reduction in bandwidth utilization by the device for traffic having a lesser priority than an indicated priority within the incoming request; and, in response,
temporarily reducing bandwidth utilization by the device for traffic at the device having a lesser priority than the indicated priority within the incoming request according to the incoming request.

3. The method as in claim 1, wherein the threshold amount is complete expiration of the length of time.

4. The method as in claim 1, wherein the length of time is unlimited for one or more priorities lesser than a threshold priority.

5. The method as in claim 1, further comprising:
determining that a portion of received traffic at the device has a particular priority that is equal to or greater than the priority of the packet; and, in response, suppressing transmission of the request.

6. The method as in claim 1, wherein the one or more reachable neighbors are configured to forward the request one hop further from the device.

7. The method as in claim 1, wherein the bandwidth reduction is selected from a group consisting of: an absolute bandwidth reduction; a fraction of channel capacity of the shared-media communication network; and a fraction of currently utilized capacity of the shared-media communication network by each respective reachable neighbor.

8. The method as in claim 1, wherein the priority of the packet is limited to either being a priority packet or a non-priority packet.

9. The method as in claim 1, further comprising:
receiving configuration of how to classify priority of packets from a global device selected from a group consisting of: a network management server (NMS); a root node of a directed acyclic graph (DAG); a head-end application device; a dynamic host configuration protocol (DHCP) server; and a Constrained Application Protocol (CoAP) server.

10. The method as in claim 1, wherein determining the priority of the packet is based on a factor selected from a group consisting of: a priority field within the packet; a packet type of the packet; a traffic class of the packet; a particular flow associated with the packet; a particular differentiated services (DS) byte value within the packet; a particular destination address of the packet; a particular source address of the packet; and a certain factor based on deep packet inspection of the packet.

11. A method, comprising:
receiving an incoming request at a device in a shared-media communication network from a particular reachable neighbor of one or more reachable neighbors, the incoming request for a temporary reduction in bandwidth utilization by the device for traffic having a lesser priority than an indicated priority within the incoming request; and, in response,
temporarily reducing bandwidth utilization by the device for traffic at the device having a lesser priority than the indicated priority within the incoming request according to the incoming request.

12. The method as in claim 11, further comprising:
determining a priority of a packet to be queued by the device during the temporary reduction of bandwidth utilization;
determining that the priority is equal to or greater than the indicated priority within the incoming request; and, in response,
attempting to successfully transmit the queued packet within the shared-media communication network without consideration of the temporary reduction of bandwidth utilization.

13. The method as in claim 11, further comprising:
forwarding the incoming request from the device one hop further from the particular reachable neighbor.

14. The method as in claim 11, wherein the bandwidth reduction is selected from a group consisting of: an absolute bandwidth reduction; a fraction of channel capacity of the shared-media communication network; and a fraction of currently utilized capacity of the shared-media communication network by the device.

15. The method as in claim 11, further comprising:
receiving, within the incoming request, a specified duration for which the bandwidth utilization is to be temporarily reduced.

16. The method as in claim 11, wherein priority of a packet in the communication network is limited to either being a priority packet or a non-priority packet.

17. An apparatus, comprising:
one or more network interfaces to communicate with one or more reachable neighbors in a shared-media communication network;
a processor coupled to the network interfaces and adapted to execute one or more processes; and
a memory configured to store a process executable by the processor, the process when executed operable to:
determine a priority of a packet to be queued at the apparatus;
determine, based on the priority, a length of time the packet is allowed to be queued before successfully transmitting the packet;
attempt to successfully transmit the queued packet within the shared-media communication network; and
transmit a request to the one or more reachable neighbors in the shared-media communication network in response to reaching a threshold amount of the length of time without having successfully transmitted the queued packet, the request for a temporary reduction in bandwidth utilization by the reachable neighbors for traffic having a lesser priority than the priority of the packet.

18. The apparatus as in claim 17, wherein the process when executed is further operable to:
receive an incoming request from a particular reachable neighbor of the one or more reachable neighbors, the incoming request for a temporary reduction in bandwidth utilization by the device for traffic having a lesser priority than an indicated priority within the incoming request; and, in response,
temporarily reduce bandwidth utilization by the apparatus for traffic at the apparatus having a lesser priority than the indicated priority within the incoming request according to the incoming request.

19. An apparatus, comprising:
one or more network interfaces to communicate with one or more reachable neighbors in a shared-media communication network;
a processor coupled to the network interfaces and adapted to execute one or more processes; and
a memory configured to store a process executable by the processor, the process when executed operable to:
receive an incoming request from a particular reachable neighbor of the one or more reachable neighbors, the incoming request for a temporary reduction in bandwidth utilization by the apparatus for traffic having a lesser priority than an indicated priority within the incoming request; and, in response,
temporarily reduce bandwidth utilization by the apparatus for traffic at the apparatus having a lesser priority than the indicated priority within the incoming request according to the incoming request.

20. The apparatus as in claim 19, wherein the process when executed is further operable to:
determine a priority of a packet to be queued by the apparatus during the temporary reduction of bandwidth utilization;
determine that the priority is equal to or greater than the indicated priority within the incoming request; and, in response,
attempt to successfully transmit the queued packet within the shared-media communication network without consideration of the temporary reduction of bandwidth utilization.

21. The apparatus as in claim 19, wherein the process when executed is further operable to:
forward the incoming request one hop further from the particular reachable neighbor.

22. A tangible, non-transitory, computer-readable media having software encoded thereon, the software when executed by a processor on a device in a shared-media communication network operable to:
determine a priority of a packet to be queued at the device;
determine, based on the priority, a length of time the packet is allowed to be queued before successfully transmitting the packet;
attempt to successfully transmit the queued packet within the shared-media communication network; and
transmit a request from the device to one or more reachable neighbors in the shared-media communication network in response to reaching a threshold amount of the length of time without having successfully transmitted the queued packet, the request for a temporary reduction in bandwidth utilization by the reachable neighbors for traffic having a lesser priority than the priority of the packet.

23. The computer-readable media as in claim 22, wherein the software when executed is further operable to:
receive an incoming request at the device from a particular reachable neighbor of the one or more reachable neighbors, the incoming request for a temporary reduction in bandwidth utilization by the device for traffic having a lesser priority than an indicated priority within the incoming request; and, in response,
temporarily reduce bandwidth utilization by the device for traffic at the device having a lesser priority than the indicated priority within the incoming request according to the incoming request.

* * * * *